(12) United States Patent
Min

(10) Patent No.: US 8,117,997 B2
(45) Date of Patent: Feb. 21, 2012

(54) DUAL PIPE HEAT EXCHANGER OF BOILER FOR HOUSE HEATING AND HOT WATER

(75) Inventor: Tae-Sik Min, Dongjak-gu (KR)

(73) Assignee: Kyungdong Everon Co., Ltd. (KR)

( * ) Notice: Subject to any disclaimer, the term of this patent is extended or adjusted under 35 U.S.C. 154(b) by 791 days.

(21) Appl. No.: 12/085,238

(22) PCT Filed: Mar. 10, 2006

(86) PCT No.: PCT/KR2006/000866
§ 371 (c)(1),
(2), (4) Date: May 19, 2008

(87) PCT Pub. No.: WO2007/061158
PCT Pub. Date: May 31, 2007

(65) Prior Publication Data
US 2009/0283249 A1    Nov. 19, 2009

(30) Foreign Application Priority Data

Nov. 22, 2005  (KR) .................. 10-2005-0111632

(51) Int. Cl.
*F22B 1/18* (2006.01)
(52) U.S. Cl. .................. 122/31.1; 165/104.14; 165/164; 165/168
(58) Field of Classification Search ............... 122/31.1, 122/20 B, 20 R, 32, 40; 165/104.14, 104.19, 165/104.22, 164, 168
See application file for complete search history.

(56) References Cited

U.S. PATENT DOCUMENTS 2,099,493 A * 11/1937 Mahoney ..................... 165/143
3,603,379 A *  9/1971 Leonard, Jr. ................. 165/50
(Continued)

FOREIGN PATENT DOCUMENTS

JP          51-33340          3/1976
(Continued)

OTHER PUBLICATIONS

International Search Report for Application No. PCT/KR2006/000866, dated May 25, 2006.

(Continued)

*Primary Examiner* — Gregory A Wilson
(74) *Attorney, Agent, or Firm* — Nelson Mullins Riley & Scarborough LLP; Anthony A. Laurentano

(57) ABSTRACT

Disclosed is a double pipe heat exchanger for a boiler supplying heating water and hot water, which can prevent water from being condensed even if cold heating water or cold water is introduced into an inlet of the heat exchanger in the boiler for supplying heating water and hot water The heat exchanger includes: a plurality of outer heating water pipes to which combustion heat is applied from a burner of a combustion chamber; a plurality of inner pipes, each of which is inserted in each outer pipe; a returned heating water pipe in which cold heating water is introduced; and a cold water pipe in which cold water is introduced, wherein the returned heating water pipe and the cold water pipe are connected to one of the inner pipes. The heat exchanger has a structure in that returned cold heating water or cold water is firstly introduced into the inner pipe of an heat exchanger, sufficiently preheated, and introduced into the outer pipe of the heat exchanger again, thereby preventing water from being condensed around an inlet of the heat exchanger through which returned cold heating water or cold water is introduced.

4 Claims, 4 Drawing Sheets

U.S. PATENT DOCUMENTS

| | | | | |
|---|---|---|---|---|
| 3,722,582 | A | * | 3/1973 | Rinecker ........................ 165/143 |
| 3,818,975 | A | * | 6/1974 | Tokumitsu et al. ............. 165/95 |
| 3,907,026 | A | * | 9/1975 | Mangus ........................... 165/70 |
| 4,492,093 | A | * | 1/1985 | Schwarz ....................... 62/238.6 |
| 5,732,769 | A | * | 3/1998 | Staffa ............................. 165/154 |

FOREIGN PATENT DOCUMENTS

| | | |
|---|---|---|
| JP | 2000-146299 | 5/2000 |
| JP | 2002-213757 | 7/2002 |
| KR | 1985-0001607 | 7/1985 |
| KR | 1995-0011995 | * 5/1995 |
| KR | 20-0152394 | 7/1999 |
| KR | 2001-0007413 | 1/2001 |
| KR | 10-2003-0078344 | * 11/2003 |
| KR | 2003-0097212 | 12/2003 |
| KR | 10-2005-0043438 | * 5/2005 |

OTHER PUBLICATIONS

Japanese Office Action for Application No. 2008-542219, dated Jun. 21, 2011.

* cited by examiner

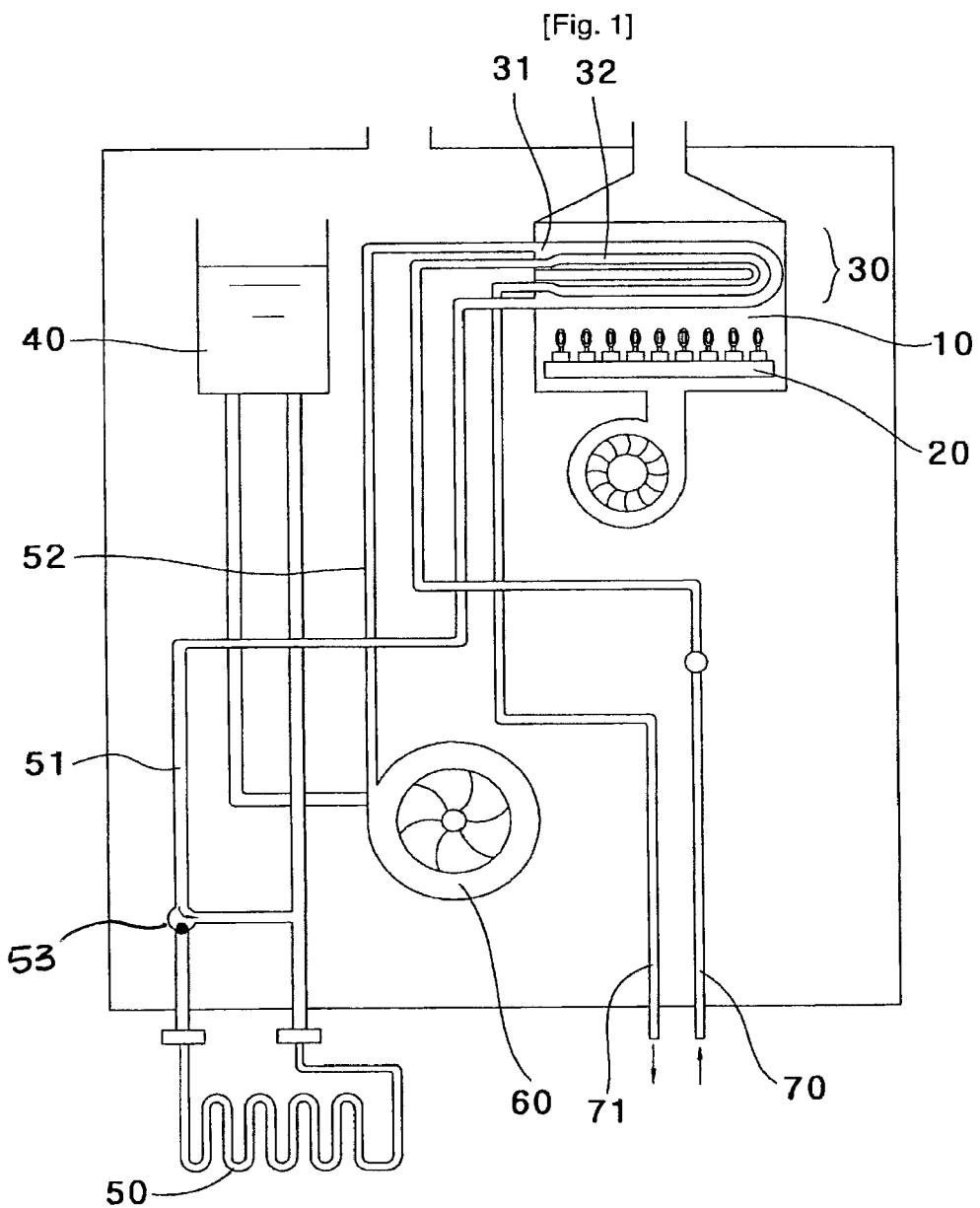
[Fig. 1]
PRIOR ART

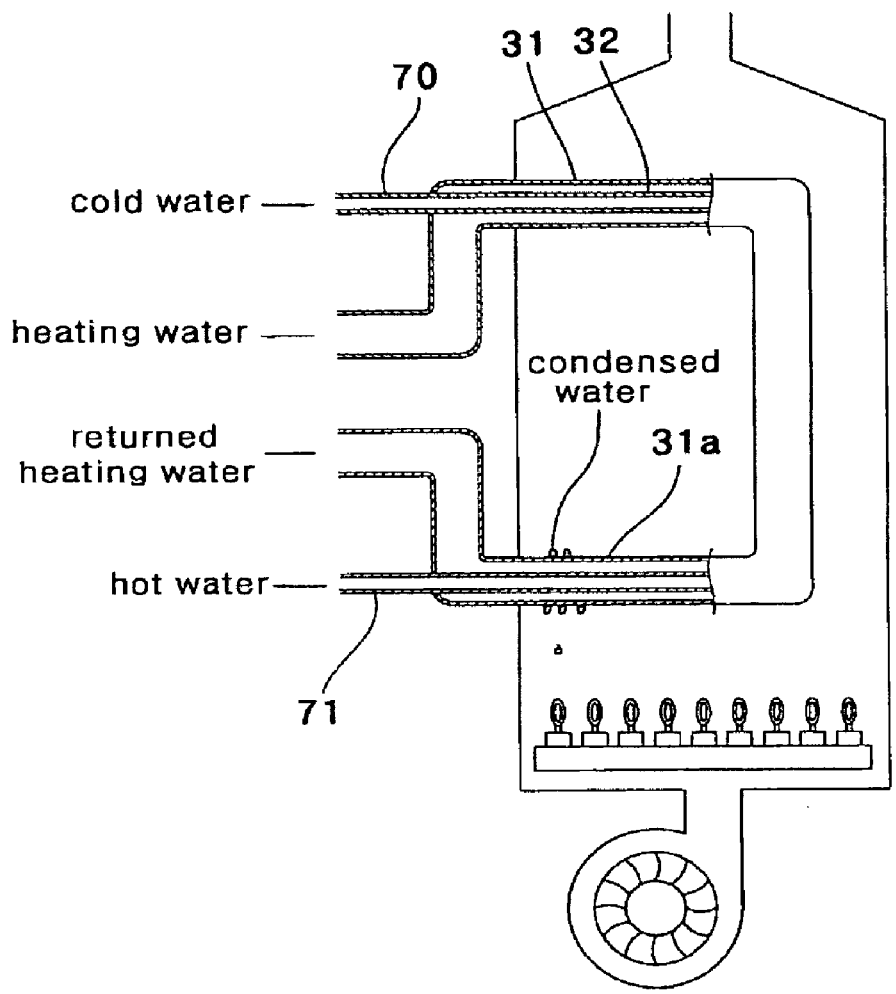
[Fig. 2]
PRIOR ART

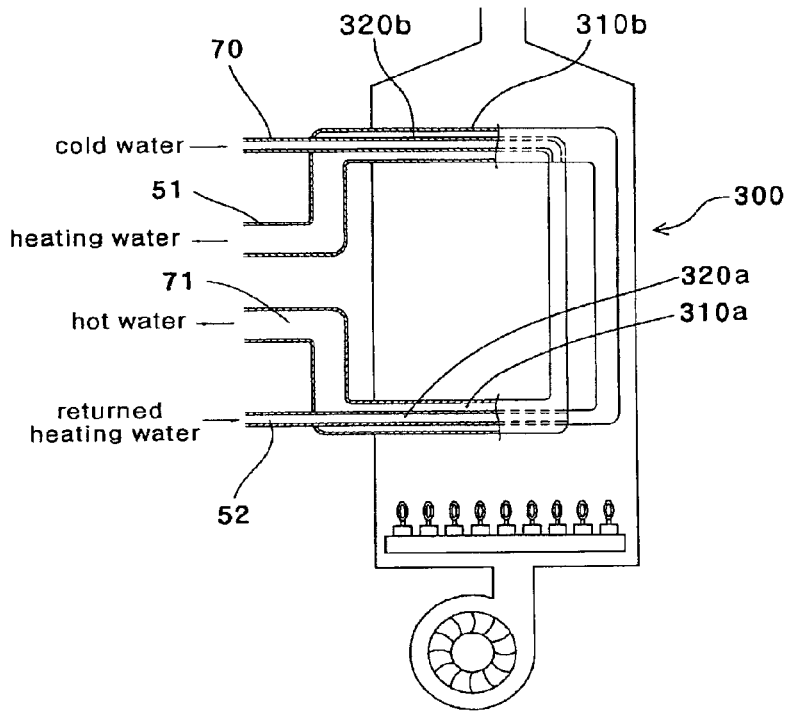
[Fig. 3]
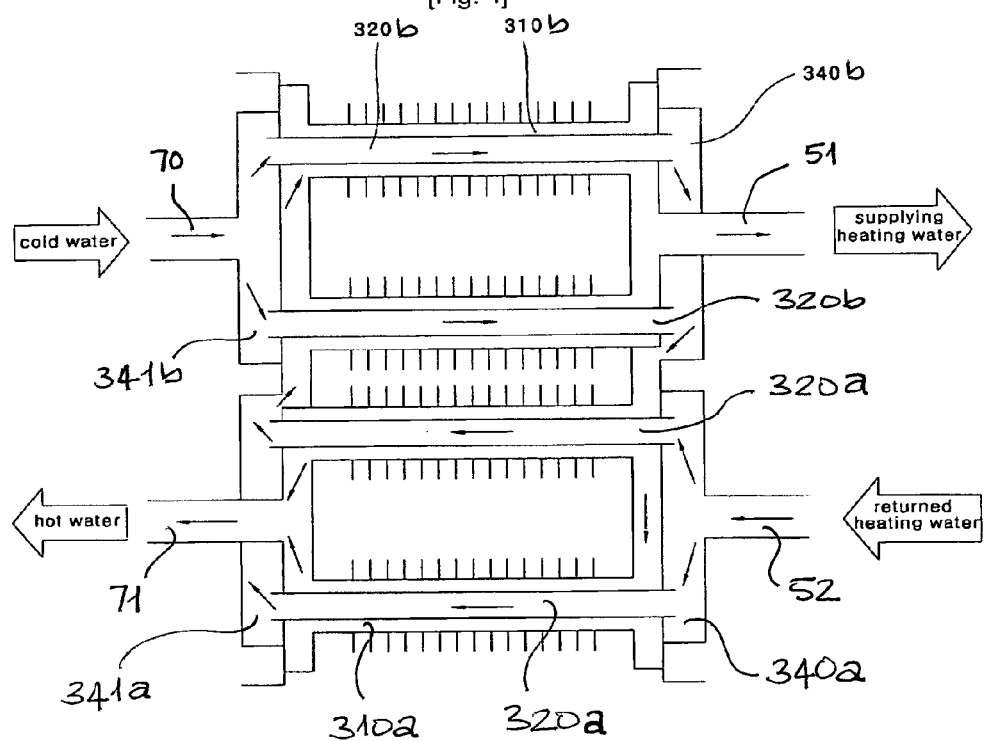
[Fig. 4]

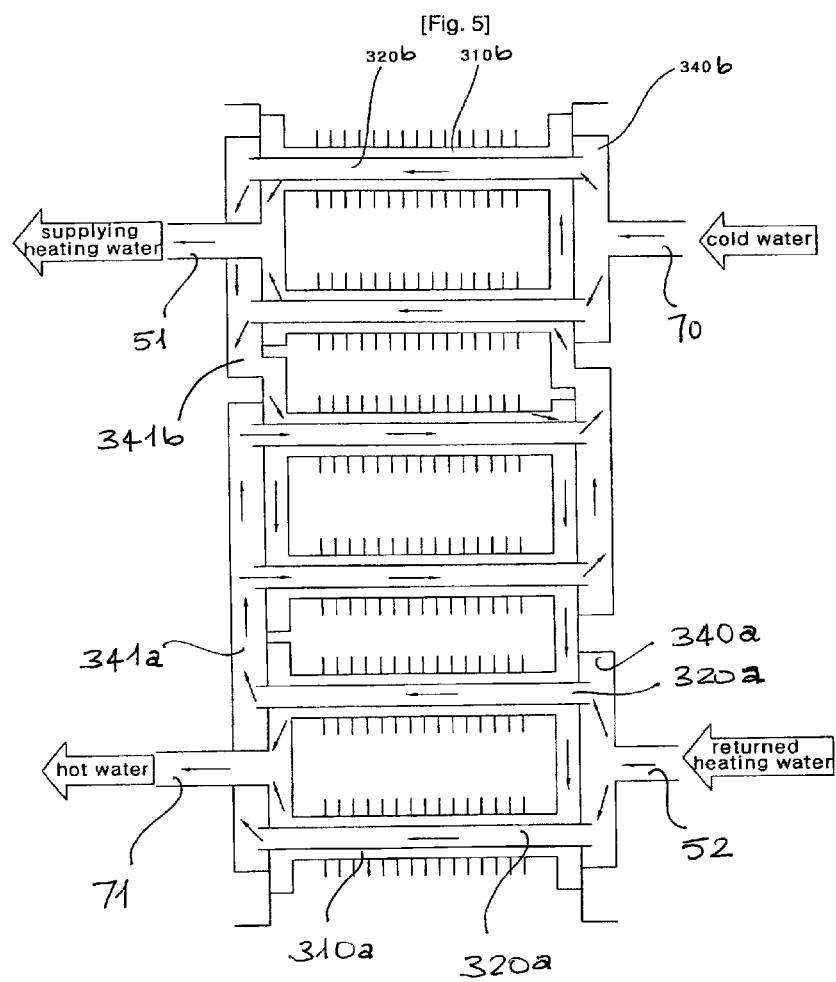

DUAL PIPE HEAT EXCHANGER OF BOILER FOR HOUSE HEATING AND HOT WATER

TECHNICAL FIELD

The present invention relates to a double pipe heat exchanger for a boiler supplying heating water and hot water, and more particularly to a double pipe heat exchanger for a boiler supplying heating water and hot water, which can prevent water from being condensed even if cold heating water or cold water is introduced into an inlet of the heat exchanger in the boiler for supplying heating water and hot water.

BACKGROUND ART

As well known, boilers have been used for heating rooms and supplying hot water at home or in public buildings. Generally, a boiler uses oil or gas as fuel and burns the fuel using a burner. Then, the boiler heats water using generated combustion heat during a procedure of combustion, and circulates the heated water to heat rooms or to supply hot water if necessary.

Generally, the boilers use a double pipe heat exchanger or a single pipe heat exchanger. The double pipe heat exchanger refers to one in which a hot water heat exchanging pipe is inserted into a heating water heat exchanger. The single pipe heat exchanger refers to one in which a hot water heat exchanger and a heating water heat exchanger are separately installed.

Since a boiler having the double pipe heat exchanger can be manufactured to be in a compact size in comparison with a boiler with the single pipe heat exchanger, it is possible to reduce a manufacturing cost of the boiler. Further, the boiler has a high heat efficiency.

FIG. 1 is a view showing a configuration of a conventional boiler having a double pipe heat exchanger.

In the conventional boiler, a burner 20 is disposed at a lower portion of a combustion chamber 10. A heat exchanger 30 is installed at an upper portion of the burner 20. Therefore, heat energy generated from the burner 20 is transferred to the heat exchanger 30 including pipes through which water generally flows.

While heating rooms, water stored in an expansion tank 40 of the boiler flows to the heat exchanger 30 by means of a circulation pump 60. Then, water heated by the heat exchanger 30 flows to a heating water line 50 through a heating water supply pipe 51 so as to heat rooms and sequentially circulates through the returned heating water pipe 52, which in turn returns to the expansion tank 40.

The conventional boiler with the double pipe heat exchanger has been designed in which a heating water line 50 is interrupted by means of a three-way valve 53 in order to rapidly supply hot water so that combustion heat of the burner 20 is transferred to the inner pipe 32 through the outer pipe 31 when a user uses the hot water.

Generally, if the temperature of heating water introduced into the heat exchanger 30 of the boiler is lower than a dew point of water vapor included in exhaust gas generated by the combustion in the burner 20, heating water is condensated.

Furthermore, hydrocarbon $C_nH_{2n+2}$ included in fuel for the boiler reacts with oxygen $O_2$ and is converted into water vapor $H_2O$ and carbon dioxide $CO_2$ while radiating heat. Then, exhaust gas is discharged outside through an exhaust port.

However, when water vapor mixed with the exhaust gas is cooled by means of an inlet pipe in which cold water or returned heating water is introduced, so that its temperature decreases below a dew point, the water vapor is converted into water $H_2O$ in a liquified state. Such condensated water reacts upon sulfur dioxide $SO_2$ which is another component involved in the exhaust gas, and is converted into sulfuric acid $H_2SO_4$ to cause corrosion around an inlet of a pipe for the heat exchanger.

FIG. 2 is a sectional view showing a configuration of a conventional double pipe heat exchanger.

As shown in FIG. 2 attached hereto, in the conventional double pipe heat exchanger, condensation concentrically occurs at an inlet 31a of the heat exchanger in which returned cold heating water causes corrosion of pipe around the inlet of the heat exchanger. Hence, there is a problem of the reduced lifetime of the heat exchanger and the boiler.

DISCLOSURE OF INVENTION

Technical Problem

Accordingly, the present invention has been made to solve the above-mentioned problems occurring in the prior art, and it is an object of the present invention to provide a double pipe heat exchanger for a boiler supplying heating water and hot water, which can prevent the generation of condensed water even if cold heating water or cold water is introduced into an inlet of the heat exchanger in the boiler for supplying heating water and hot water.

Technical Solution

In order to accomplish the object of the present invention, there is provided a double pipe heat exchanger for a boiler supplying heating water and hot water, which includes: a plurality of outer pipes to which combustion heat is applied from a burner of a combustion chamber; a plurality of inner pipes, each of which is inserted in each outer pipe; a returned heating water pipe in which cold heating water is introduced; and a cold water pipe in which cold water is introduced, wherein the returned heating water pipe and the cold water pipe are connected to one of the inner pipes.

Further, the inner pipe connected to the returned heating water pipe has an increasing diameter and is connected to the outer pipe connected to a heating water supply pipe, and the inner pipe connected to the cold water pipe has an increasing diameter and is connected to the outer pipe connected to a hot water pipe.

Further, the returned heating water pipe extends through the hot water pipe and is connected to one inner pipe, and the cold water pipe extends through the heating water supply pipe and is connected to another inner pipe.

Further, the returned heating water pipe and the cold water pipe are connected to the inner pipes extending in parallel vertically, respectively, fluid pathway caps are sidewalls of the combustion chamber to cover both ends of the inner pipes, respectively, one end of the fluid pathway cap, in which the returned heating water flowing through the inner pipes is collected, is connected to the outer pipe connected to the heating water supply pipe, and one end of the fluid pathway cap, in which cold water is collected, is connected to the outer pipe connected to the hot water pipe.

Further, the outer and inner pipes include spiral type pipes, coil type pipes, and fin type pipes.

Advantageous Effects

A double pipe heat exchanger for the boiler supplying heating water and hot water according to the present invention has a structure in that returned cold heating water or cold water is firstly introduced into an inner pipe of the heat exchanger and sufficiently preheated, which in turn is introduced into an outer pipe. Hence, there is an advantage of preventing condensation of water vapor around an inlet through which the returned cold heating water or the cold water is introduced.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a view showing a configuration of a conventional boiler having a double pipe heat exchanger;

FIG. 2 is a sectional view showing a configuration of the conventional boiler having the double pipe heat exchanger;

FIG. 3 is a sectional view showing a configuration of a double pipe heat exchanger for a boiler supplying heating water and hot water according to an embodiment of the present invention;

FIG. 4 is a sectional view showing a configuration of a double pipe heat exchanger for a boiler supplying heating water and hot water according to the another embodiment of the present invention; and FIG. 5 is a sectional view showing a configuration of the double pipe heat exchanger for the boiler supplying heating water and hot water according to still another embodiment of the present invention.

BEST MODE FOR CARRYING OUT THE INVENTION

Hereinafter, the preferred embodiments of the present invention will be described in detail with reference to the accompanying drawings.

FIG. 3 is a sectional view showing a configuration of a double pipe heat exchanger for a boiler supplying heating water and hot water according to an embodiment of the present invention.

As shown in FIG. 3 attached hereto, two double pipes, each of which includes an outer pipe 310 and an inner pipe 320, are connected to a combustion chamber. As shown in FIG. 3 attached hereto, a returned heating water pipe 52 extends through a lower hot water pipe 71 and then is connected to the inner pipe 320a of the heat exchanger 300. The inner pipe 320a forms a double pipe along with an outer pipe 310a connected to the hot water pipe 71.

The inner pipe 320a connected to the returned heating water pipe 52 extends and is connected to the outer pipe 310b arranged on the upper portion of the boiler. The outer pipe 310b is connected to the heating water pipe 51, in which the inner pipe 320b connected to a cold water pipe 70 is inserted to form the double pipe. In this case, the outer pipe 310a connected to the lower hot water pipe 71 is connected to the inner pipe 320b which has a gradually decreasing diameter and is connected to a cold water pipe 70 arranged on the upper portion of the boiler.

On the other hand, the returned heating water pipe 52 through which returned heating water is introduced into the heat exchanger extends through the hot water pipe 71 and is connected to the inner pipe 320a of the heat exchanger 300. Further, the cold water pipe 70 extends through the heating water supply pipe 51 and is connected to another inner pipe 320b of the heat exchanger 300.

Accordingly, it is possible to avoid a direct connection of the inner pipes 320a and 320b, through which returned cold heating water and cold water flow, with exhaust gas in the combustion chamber. While flowing along the inner pipe 320a, the returned cold heating water is preheated by hot water flowing along the outer pipe 310a and then flows through the outer pipe 310b of another double pipe. Thus, it is possible to prevent the generation of condensed water. Further, while flowing along the inner pipe 320b, the cold water is preheated by hot water flowing through the outer pipe 310b and then flows along the outer pipe 310a of another double pipe. Thus, it is possible to prevent the generation of condensed water.

FIG. 4 is a sectional view showing a configuration of a double heat exchanger for a boiler supplying heating water and hot water according to another embodiment of the present invention.

As shown in FIG. 4, a double pipe, which includes one outer pipe 310a and two inner pipes arranged in parallel, is installed in a lower portion of the heat exchanger. Another double pipe, which includes one outer pipe 310b and two inner pipes arranged in parallel, is installed in an upper portion of the heat exchanger in which cold water is introduced. Two double pipes are stacked on each other. In this case, two inner pipes 320a and 320b installed in parallel are connected to each other by means of fluid pathway caps 340 and 341. In this embodiment, two inner pipes 320b are provided in the heat exchanger. However, two or more inner pipes may be installed in the beat exchanger according to the capacity of the boiler.

As shown in FIG. 4 attached hereto, the returned heating water pipe 50 in which the returned cold heating water is introduced is connected to the fluid pathway cap 340 a at the lower portion of the heat exchanger. The fluid pathway cap 340 a is installed to a sidewall of the combustion chamber and covers an end of two inner pipes 320 a extending in parallel vertically.

The inner pipes 320a extend through the outer pipe enclosing the inner pipes 320a and are connected to another cap 341a. The fluid pathways for the returned heating water flowing through the plurality of inner pipes 320a are collected in the fluid pathway cap 341a. The upper end of the fluid pathway cap 341a is connected to the lower end of the outer pipe 310b installed at the upper portion of the heat exchanger. The outer pipe 310b is connected to the heating water supply pipe 51.

Further, the cold water pipe 70 in which cold water is introduced is connected to the fluid pathway cap 341b at a side of the heat exchanger. The fluid pathway cap 341b is attached to a sidewall of the combustion chamber and covers two inner pipes 320b extending in parallel vertically.

The inner pipe 320b extends through the outer pipe 310b enclosing the inner pipe 320b and is connected to the fluid pathway cap 340b attached to another side of the heat exchanger. The fluid pathways for cold water flowing through the plurality of inner pipes 320b are collected in the fluid pathway cap 340b. The lower end of the fluid pathway cap 340b is connected to the upper end of the outer pipe 310a installed at the lower end of the heat exchanger. The outer pipe 310a is connected to the hot water pipe 71.

According to the embodiment of the present invention with the above-mentioned structure, the returned cold heating water introduced through the returned heating water pipe 52 flows along two inner pipes 320a connected to each other in parallel by way of the fluid pathway cap 340a and is preheated by hot water flowing along the outer pipe 310a enclosing the inner pipes 320a. Then, the returned cold heating water flows along the outer pipe 310b arranged on the upper portion of the heat exchanger. Hence, it is possible to prevent the generation of condensed water.

Further, cold water introduced through the cold water pipe 70 flows along two inner pipes connected to each other in parallel by way of the fluid pathway cap 341b and is preheated by hot water flowing in the outer pipe 310b enclosing the inner pipe 320b. Then, the cold water flows along the outer pipe 310a arranged on the lower portion of the heat exchanger. Hence, it is possible to prevent water from being condensed.

Further, since the fluid pathway caps 340 and 341, which are attached to the outside of the combustion chamber, are used as connection pipes of the heat exchanger in which a plurality of double pipes are arranged, the heat exchanger can have a simple structure of the double pipe. The pathway of the double pipe can be easily changed.

FIG. 5 is a sectional view showing the configuration of the double pipe heat exchanger for the boiler supplying heating water and hot water according to another embodiment of the present invention.

As shown in FIG. 5, the double pipe heat exchanger has a similar structure to that of the double pipe heat exchanger shown in FIG. 4, but has a difference from the double pipe heat exchanger shown in FIG. 4, in which three bundles of double pipes respectively including an outer pipe 310 and an inner pipe 320 are stacked on one another in three rows.

As shown in FIG. 5 attached hereto, a returned heating water pipe 52, in which returned cold heating water is introduced, and a cold water pipe 70, in which cold water is introduced, are connected to each other by means of inner pipes 320a and 320b arranged in parallel in the heat exchanger.

Therefore, returned cold heating water flows along the inner pipe 320a and is preheated by hot water flowing through the outer pipe 310a. Then, the returned cold heating water flows to the outer pipe 310b by way of fluid pathway cap 341a. Cold water flows through the inner pipe 320b in the uppermost bundle of pipes and is preheated by hot water flowing through the outer pipe 310b enclosing the inner pipe 320b. Then, the cold water flows through the outer pipe 310a in the lowest bundle of pipes. Thus, it is possible to prevent water from being condensed.

Preferably, the outer and inner pipes 310 and 320 include spiral type pipes, coil type pipes, and fin type pipes in order to increase contact area with exhaust gas so as to improve the heat transfer capability of the heat exchanger.

INDUSTRIAL APPLICABILITY

The present invention provides a double pipe heat exchanger for a boiler supplying heating water and hot water, which has a structure in that returned cold heating water or cold water is firstly introduced into the inner pipe of an heat exchanger, sufficiently preheated, and introduced into the outer pipe of the heat exchanger again, thereby preventing water from being condensed around an inlet of the heat exchanger through which returned cold heating water or cold water is introduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A double pipe heat exchanger for a boiler supplying heating water and hot water, the heat exchanger comprising:
a plurality of outer pipes to which combustion heat is applied from a burner of a combustion chamber;
a plurality of inner pipes, each of which is inserted in each outer pipe;
a returned heating water pipe in which cold heating water is introduced; and
a cold water pipe in which cold water is introduced,
wherein the returned heating water pipe and the cold water pipe are connected to one of the inner pipes, and
wherein the inner pipe connected to the returned heating water pipe has an increasing diameter and is connected to the outer pipe connected to a heating water supply pipe, and the inner pipe connected to the cold water pipe has an increasing diameter and is connected to the outer pipe connected to a hot water pipe.

2. The double pipe heat exchanger as claimed in claim 1, wherein the returned heating water pipe extends through the hot water pipe and is connected to one inner pipe, and the cold water pipe extends through the heater water supply pipe and is connected to another inner pipe.

3. A double pipe heat exchanger comprising:
a first double pipe and a second double pipe, wherein each one of the first double pipe and the second double pipe including:
one outer pipe to which combustion heat is applied from a burner of a combustion chamber, and
two inner pipes arranged in parallel, each of which is inserted in the outer pipe,
a returned heating water pipe through which a cold returned heating water flows is connected to the two inner pipes of the first double pipe at one end of the outer pipe of the first double pipe;
a cold water pipe through which a cold water flows is connected to the two inner pipes of the second double pipe at one end of the outer pipe of the second double pipe;
wherein fluid pathway caps are installed at both ends of each outer pipe in sidewalls of the combustion chamber such that each fluid pathway cap covers each end of the two inner pipes, wherein the other end of the outer pipe of the first double pipe is connected to the one end of the outer pipe of the second double pipe via one of the fluid pathway caps, wherein the other end of the outer pipe of the second double pipe is connected to the one end of the outer pipe of the first double pipe via one of the fluid pathway caps.

4. The double pipe heat exchanger claimed in any one of claims 1, 2 or 3, wherein the outer and inner pipes include spiral type pipes, coil type pipes, and fin type pipes.

* * * * *